United States Patent [19]

Ang et al.

[11] Patent Number: 5,759,661

[45] Date of Patent: Jun. 2, 1998

[54] SOFT TOUCH TOP COVER AND METHOD OF MANUFACTURING

[75] Inventors: Leoncio C. Ang, Bloomfield Hills; Darlene B. Collins, Southfield, both of Mich.

[73] Assignee: Chrysler Corporation, Auburn Hills, Mich.

[21] Appl. No.: 711,931

[22] Filed: Sep. 11, 1996

Related U.S. Application Data

[62] Division of Ser. No. 521,764, Aug. 31, 1996, abandoned.

[51] Int. Cl.[6] ............................ B32B 1/04; B60J 5/00
[52] U.S. Cl. ..................... 428/76; 428/72; 428/178; 428/188; 428/213; 296/146.7
[58] Field of Search ............................ 428/71, 76, 72, 428/137, 178, 188, 213, 903.3; 296/146.7; 180/90; 280/751, 752

[56] References Cited

U.S. PATENT DOCUMENTS

| | | | |
|---|---|---|---|
| 4,781,956 | 11/1988 | Zimmermann et al. | 428/43 |
| 5,102,711 | 4/1992 | Keller | 428/71 |
| 5,139,838 | 8/1992 | Baum et al. | 428/72 |
| 5,527,581 | 6/1996 | Sugawara et al. | 428/71 |

*Primary Examiner*—Donald Loney
*Attorney, Agent, or Firm*—Kenneth H. MacLean

[57] ABSTRACT

In this invention, a composite finishing cover for a component such as a vehicle instrument panel is provided by extruding a parison of inner and outer layers of different recyclable plastics having different characteristics but which are from the same family. The parison is injected with low pressure gas when forming dies are being closed thereover so that the plastics will fully conform to the forming surfaces of the die tooling cavity. The closing force of the dies cause the heat softened inner layers of the first plastics material to join at their interface to form a relatively thick core or substrate providing structural support for the relatively thin and flexible outer layer of the cover, also joined at their interface. The outer layer provides a finishing surface that exhibits a soft feel as when the human hand lightly contacts and moves across the surface thereof. Importantly, in this invention the finishing cover can be readily recycled as a unit without the necessity of separating the different plastics layers from one another since they are from the same family of plastics.

4 Claims, 3 Drawing Sheets

5,759,661

SOFT TOUCH TOP COVER AND METHOD OF MANUFACTURING

CROSS-REFERENCE TO RELATED APPLICATION

This application is a division of application Ser. No. 08/521,764, filed Aug. 31, 1996 by the same inventors as the present application now abandoned.

BACKGROUND OF THE INVENTION

Prior to the present invention, finished covers for a wide variety of products have been made from different plastic materials layered or otherwise combined by various processes into desired shapes and finishes. For example, many modern vehicles have instrument panels with special top covers that provide different degrees of softness and tactile feel to meet the customer requirements. In general three major processes and constructions are employed for such top covers as follows: (1) a "super soft" top cover made from a hard structural plastics retainer as a substrate or base, an intermediate polyurethane foam, and a roto—cast or slush molded vinyl outer skin, (2) a "soft" top cover generally comprised of a hard plastic retainer as a substrate and a bi-laminate vinyl skin that utilizes an expanded vinyl foam or polyurethane foam on the underside of the skin, and (3) a "soft touch" top cover that comprises a molded structural plastic as a base and with a top coat of "soft touch" paint applied thereto.

While each of these three processes provide desirable finishing covers and other like products, "super soft" top cover manufacturing involves relatively complex production procedures generally requiring special tooling for foaming the polyurethane and for the outer skin application. Furthermore, the aesthetic requirements of this process renders it the most costly of the three processes identified above. The "soft" top cover process is a time consuming and labor intensive method, particularly, since it requires the application of an adhesive to the skin and a thermoforming process to bond the components together. The "soft touch" top covers use a paint coating that is also labor intensive and generally compares cost wise with the "super soft" process. In any event, the plastics components of the "super soft" and "soft" covers are not from the same family of plastics materials so that separation of the different plastics is necessary since different procedures and solvents are used for recycling different plastics, so that recycling is difficult and expensive. This is also the case with the addition of the "soft touch" paint which introduces another incompatible material into the life cycle management of a "soft touch" cover.

In view of the above considerations and others of the following specification, an object, feature and advantage of this invention is to provide a new and improved process for producing a soft touch top cover of a plurality of different plastics materials but from the same family of materials to form a quality part with good interior support and desirable outer surface qualities which after completion of service life is readily and easily recyclable as a unitized part to provide improved life cycle management.

It is another feature, object and advantage to provide a new and improved soft touch top cover that has a "soft to touch" outer skin extending over and integrated with a relatively hard and rigid or semi rigid substrate providing a stabilizing base member.

Still another feature, object and advantage of this invention is to provide a new and improved outer cover and method to produce a multi layer cover of a plurality of different plastics materials that are from the same family of recyclable plastics material which are fused together and which can be readily recycled.

Another feature, object and advantage of this invention is to make a finishing cover of two or more layers of separate and different plastics materials from the same family of plastics which are compatible and recyclable. This allows the finished cover to be recycled as a unitized member without the necessity of separating the plastics layers from one another and handling them as different materials. In this invention, one of the cover components provides a relatively thick substrate for structural rigidity while the outer component layer is a relatively thin outer sheet with a textured outer surface providing a "soft feel or touch" sensation that one may experience when touching and rubbing their hand across the outer surface thereof.

In the preferred embodiment of this invention, a pair of plastics extruders are employed with a co-extrusion blow molding unit for producing a co-extruded parison formed of two different materials of the same plastics family. One extruder unit processes the base plastics material that is forced through a mandrel of a blow molding unit to form the core of the parison while an associated satellite extruder processes the plastics material also forced through the mandrel simultaneously to form the outer skin of the parison. When the parison has grown to a sufficient size and the molding tools are being closed, low pressure air is injected into the parison so that the parison fully conforms to the configuration of the mold cavity. The closure force of the tools when molding the parison into a final shape, such as a finished cover of one family of plastics, causes the heat softened inner layers of the parison to physically engage one another and fuse together. The outer layer or skin of the parison joins with the inner layers at the interface therewith because of miscibility of the two materials. When the part is being formed in the dies, an air passage may be molded into the cover providing ducting for heat and air conditioning. The finished part when removed from the molds can be easily handled because of the structural support of the core while the outer skin provides for the required "soft feel".

These and other features, objects and advantages of this invention will become more apparent from the following detail description and drawing in which:

DETAILED DESCRIPTION OF THE DRAWINGS

Figure 1:
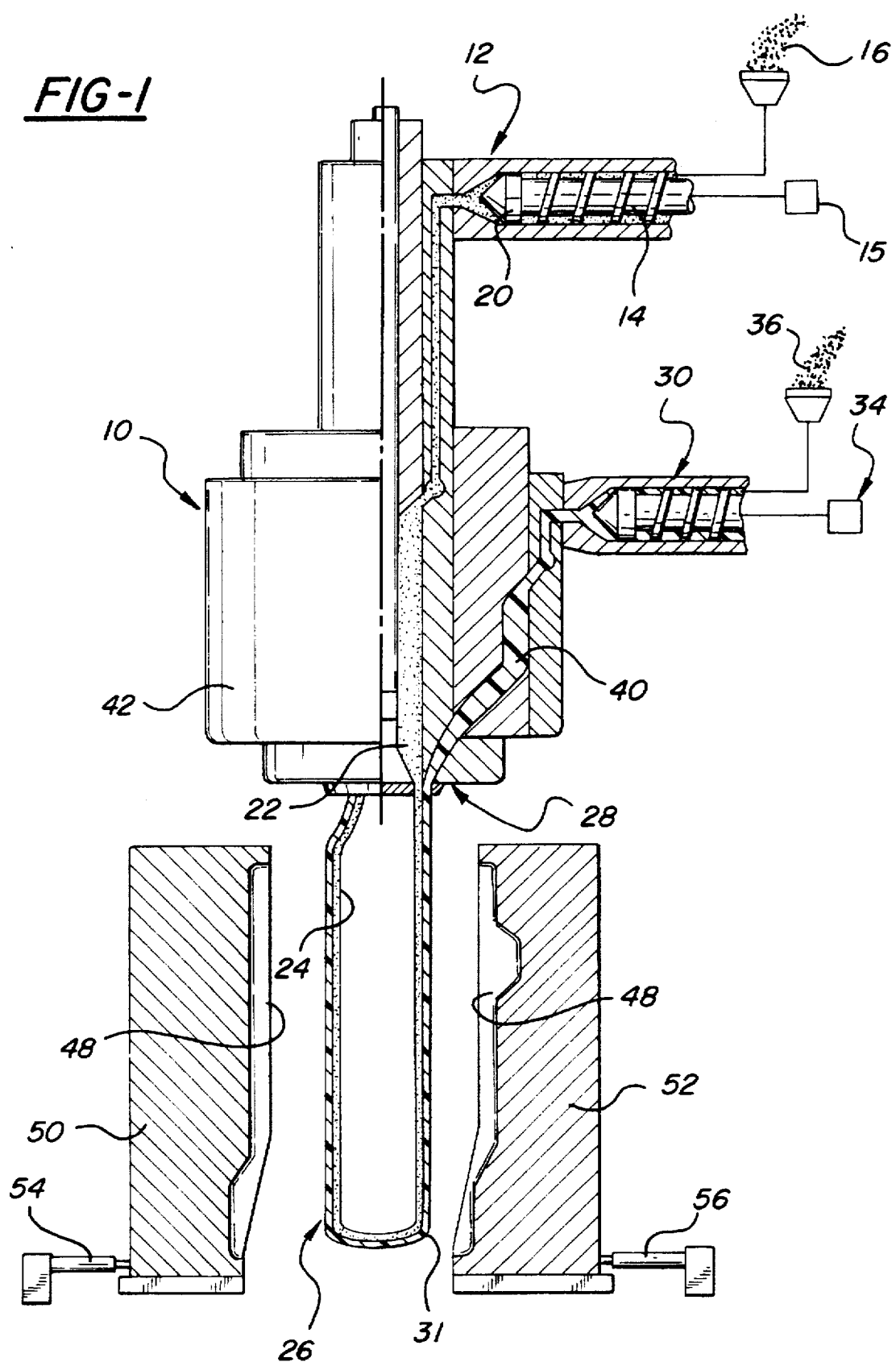
FIG. 1 is diagrammatic side elevation view of plastics extruders and co-extrusion unit extruding a parison of plastics material into a forming mold, shown in open position.

Turning now in greater detail to the drawings, there is shown in FIG. 1 a co-extrusion blow molding unit 10 which is supplied with a quantity of first thermoplastics material, such as high density polyethylene or polypropylene each filled with suitable minerals such as Talc or Mica by means of a primary plastics extruder 12. The extruder has a plasticating screw 14 that is fed with the first thermoplastics 16 in granular or powder form which is conventionally driven by an actuator 15. The plasticating screw 14 is rotated by the actuator 15 and pulsated in the extruder housing to force heated plastics melt through the one-way valve 20 of the screw 14 onto an inner accumulator 22 of the co-extrusion blow molding unit 10. In the method or process of this invention this heated plastics material forms the inner layer 24 of a parison 26 extruded through the mandrel 28 of the unit.

In addition to the extruder 12, a second satellite plastics extruder 30 has a plasticating screw 32 operatively mounted within the extruder that is driven by an actuator 34. The extruder 30 and plasticating screw 32 is supplied with a different kind of granular or powder thermoplastics material 36, such as polyethylene based polyolefin elastomer (POE) or polypropylene based thermoplastic elastomer TPO which is of the same family of plastics as the first plastics material but has different characteristics.

Figure 2:
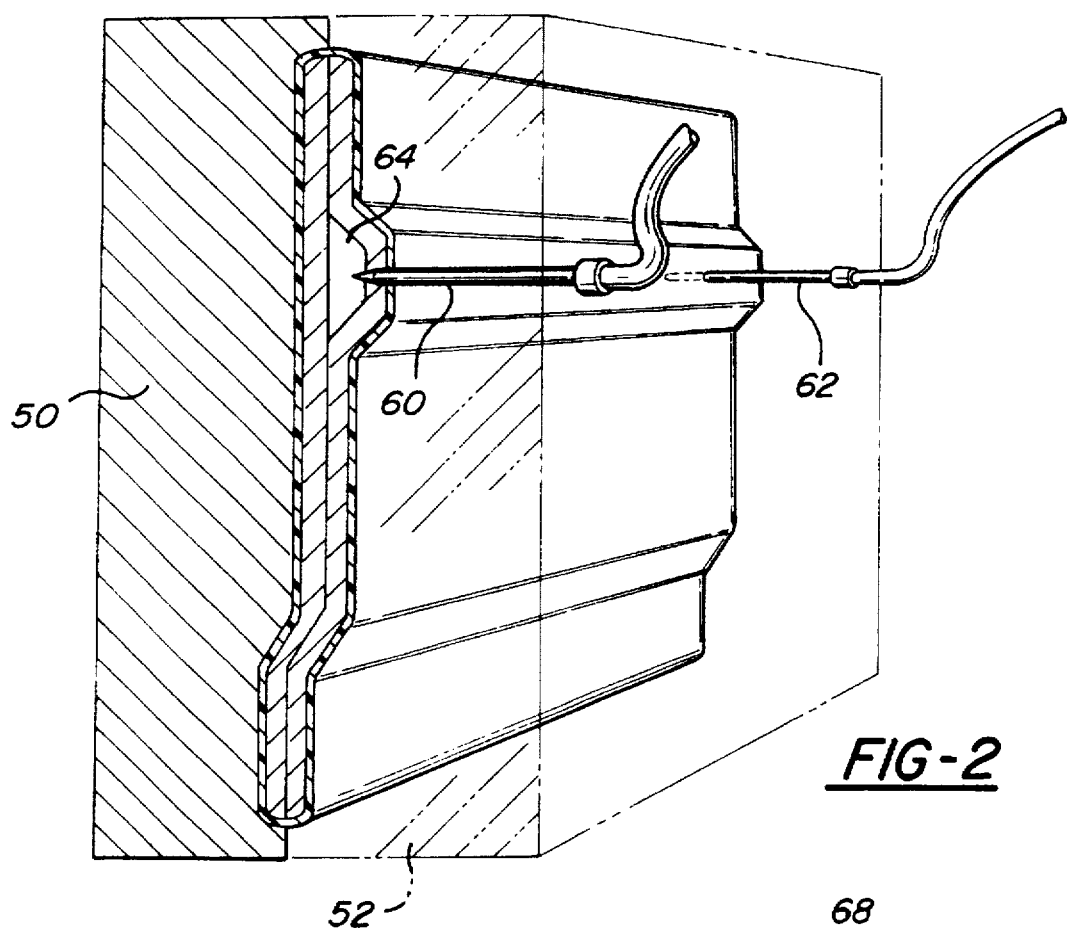
FIG. 2 is a pictorial view of a portion of the forming mold of FIG. 1 showing the mold in a closed position and the molding of a top cover.

The second extruder unit 30 feeds heated plastics melt into an outer annular accumulator 40 of the accumulator head 42 of the co-extrusion blow molding unit 10. From the accumulator 40 the material in molten state is fed through the mandrel 28 in the end of the accumulator head to form the outer skin 31 of the parison 26. The parison is conventionally formed into a tubular shape so that it has sufficient material and can be blown to correspond to the closed cavity 48 of the mold tooling 50, 52, but shown in the open position in FIG. 1. The two molds halves are operated by the power cylinders 54, 56 to move the mold halves between open and closed positions. As the mold is closing, pressurized air is injected into the parison through air supply injectors 60. This air may be injected into a centralized region 64 of the parison as air is exhausted therefrom through exhaust tube 62 appropriately sized or controlled to control the air pressure in this area. Accordingly, the parison conforms to the cavity of the mold, as shown in the sectional view in FIG. 2. With this blow molding, an air conducting passage or duct 66 extending transversely within the molded part here forming a top cover 68 is provided.

Figure 3:
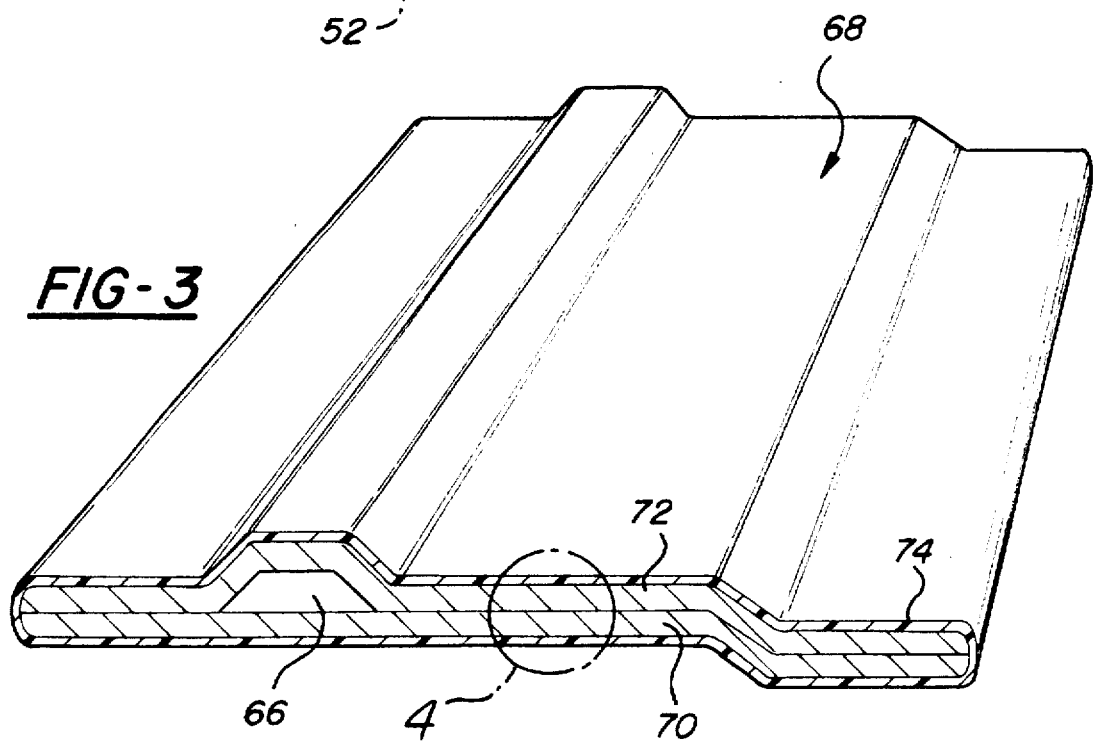
FIG. 3 is a pictorial view of a portion of the formed part produced by the mold operation of FIG. 1 and 2.
Figure 4:
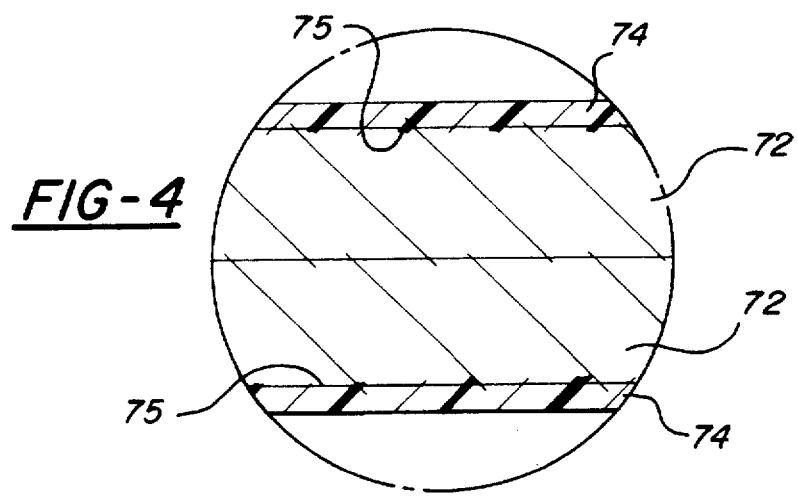
FIG. 4 is an enlargement of the circled portion of FIG. 3 showing the miscibility of the plastic layers forming the part of FIG. 3.
Figure 5:
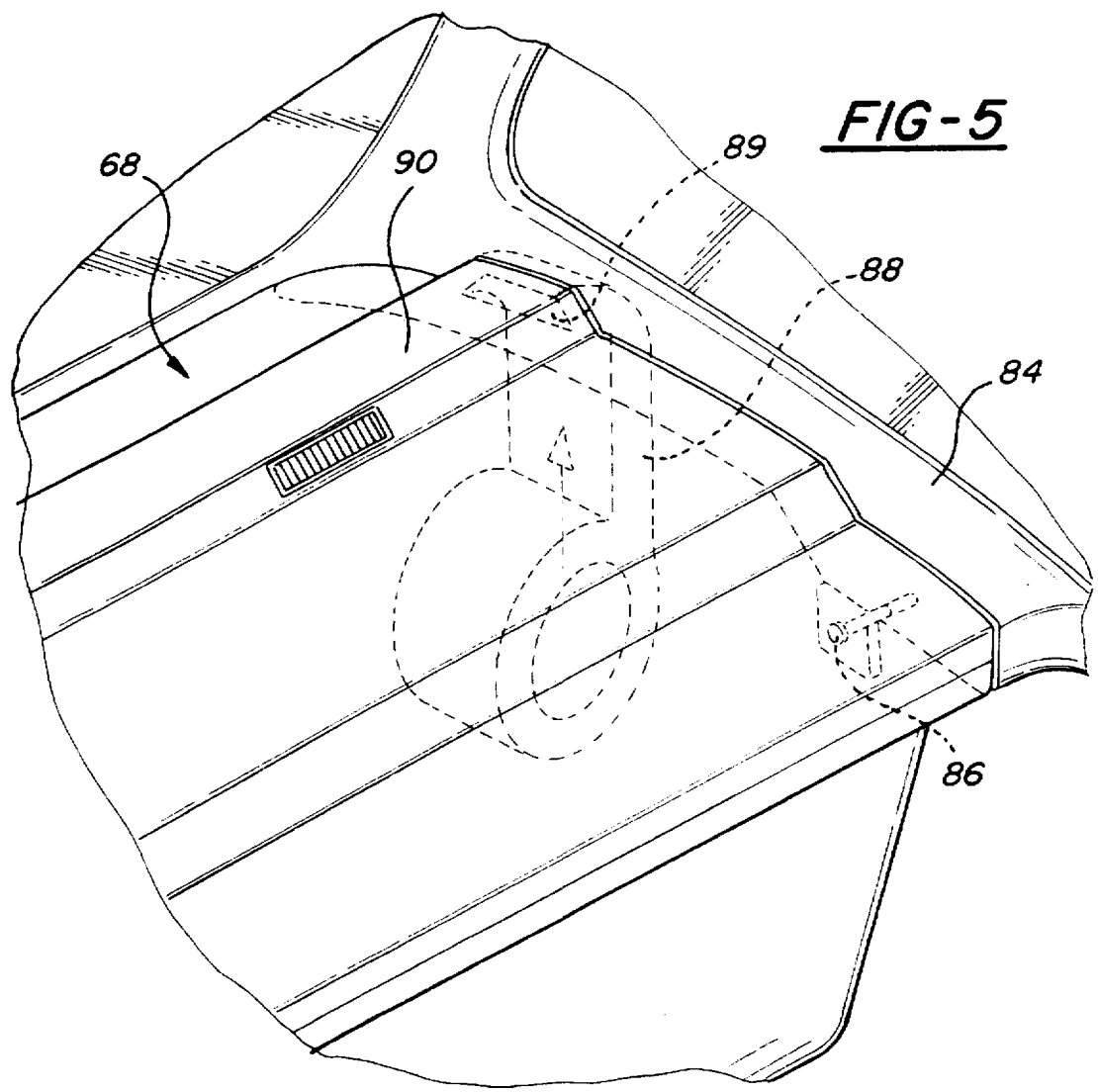
FIG. 5 is a pictorial view showing the part in the form of an instrument panel top cover as installed in a vehicle.

As shown best in FIGS. 3, 4 and 5, the molded top cover 68 has the interior layers 70, 72 forming an integrated rigid substrate provided by the inner layer 24 or wall of the parison forced and fused together by the mold halves while the outer layer or skin 31 of the parison forms the peripheral or outer layer 74 of the top cover.

In FIG. 3, the top cover 68 is shown substantially finished with the outer layer 74 providing the "soft feel" show surface of the top cover.

The relatively thin outer layer 74 interfaces as at 75 with the inner layers of the top cover, and since the plastics are miscible, they combine or join and securely bond together in this area.

In the event that different colors are employed, such a bright color for the outer layer and a dark color for the inner layer, the layers will be clearly distinct from one another, such as shown in FIG. 4. However, in the event that the layers are substantially of the same color, and with fused interfaces they will be difficult to discern from one another.

In FIG. 5, the molded top cover is installed in a vehicle as a cover for an instrument panel and is fastened to structure 84 therein by suitable fasteners 86. As shown in dashed lines, an air blower 88 is provided which has an output 89 operatively connected to the transverse cross channel 90 formed by the blow molding operation of FIG. 2 to pump streams of air therethrough. With this construction, there is also improved acoustical performance and reduced vibrational noises, such as squeaks and rattles between the panel and its adjacent structures because of vibrating damping provided by the panel.

The substrate layers 70, 72 or base of the top cover is formed by the interior layer of the parison and being of the first dense plastics has substantial rigidity or is at least semi-rigid so as to provide good support for the outer cover. The outer cover preferably has low durometer hardness and has a "soft feel" characteristics as when a person lightly touches and moves their hand across the outer periphery of the instrument panel. This "soft feel" does not necessarily include deformation of the top cover with or without memory or resilience but does include the tactile soft feeling of the cover when touched. Such "soft feel" is desirable for many applications, such as the top cover of the instrument panel as described, or other covered areas or interior components.

In this invention, recycling is enhanced since the instrument panel cover is a material of one family. More particularly, when the vehicle is being recycled, the panel can be removed from the interior of the vehicle and then shredded without the requirement of removing the finishing cover from the backing layer or base as previously required in prior art instrument panel covers. Accordingly, the outer and inner layers of the instrument panel can be cut into particles or granulized and recycled and used as the substrate thermoplastics material 16 in FIG. 1 to be extuded as the inner layer 24 of the parison 26. The soft feel layer will be provided by material 36 as previously described. The recycled plastics material can also be readily used to make other suitable articles.

The core or substrate material 16 suitable for this invention may be a high density polyethylene such as "Marlex" produced by Phillips Petroleum Co. or HDPE produced by Dow Chemical Co. Another suitable substrate material is a polypropylene such as "Escorene" or "Mytex" produced by Exxon.

The skin can be made from polyethylene based Polyolefin elastomer (POE) such as "ENGAGE" produced by Dow Chemical, or polypropylene based thermoplastic elastomer TPO such as "Dexflex" from D & S or "Mytex" from Exxon.

While preferred embodiments and methods of the invention have been shown and described, other embodiments and methods will now become apparent to those skilled in the art. Accordingly, this invention is not to be limited to that which is shown and described but by the following claims.

What is claimed is:

1. A unitized soft feel all plastics cover for finishing components of an automotive vehicle comprising a stiffened support core of at least two relatively thicker inner and flattened layers of a recyclable first thermoplastics material disposed in an interfacing top and bottom relationship and permanently bonded to one another at the interface thereof, and a flexible and relatively thin outer layer of a recyclable second thermoplastic material of the same family of materials as said first thermoplastic material and surrounding and in direct contact with the outermost surfaces of said support core so as to become miscible and permanently bonded thereto at least at the interface thereof, said outer layer having an outer surface providing a soft feel to the physical touch thereof, said inner and outer layers forming the entire cover which can be cut into particles for recycling without separating said inner and outer layers from one another.

2. The soft feel cover of claim 1 having a discrete air conducting passage formed between the relatively thick layers of the support core.

3. A unitized soft feel all plastics cover for finishing instrument panels of automotive vehicles comprising a rigid core of at least two relatively thicker inner layers of a first thermoplastic material of substantially constant thickness disposed in a sandwiched top and bottom relationship and permanently joined together at the common interface thereof, and a flexible and relatively thin cover layer of a second thermoplastic material of the same family of materials as said first plastic material and surrounding and in direct contact with the entire outermost surfaces of said core so as to become miscible and permanently and fully joined thereto at the interface thereof, said permanently joined cover layer and inner layers forming the entire cover which can be granulized and recycled.

4. The soft feel cover of claim 3 having a discrete air conducting passage formed between the relatively thick layers of the support core.

* * * * *